US012644799B2

(12) United States Patent
Katz

(10) Patent No.: US 12,644,799 B2
(45) Date of Patent: Jun. 2, 2026

(54) LIQUID SAMPLER, LOW HEADSPACE SYPHON AND METHOD OF USE THEREOF

(71) Applicant: Tri-Mech Design Inc., Victoria (CA)

(72) Inventor: Rodney Katz, Victoria (CA)

(73) Assignee: Tri-Mech Design, Inc., Victoria (CA)

( * ) Notice: Subject to any disclaimer, the term of this patent is extended or adjusted under 35 U.S.C. 154(b) by 272 days.

(21) Appl. No.: 18/709,967

(22) PCT Filed: Nov. 21, 2022

(86) PCT No.: PCT/CA2022/051710
§ 371 (c)(1),
(2) Date: May 14, 2024

(87) PCT Pub. No.: WO2023/087113
PCT Pub. Date: May 25, 2023

(65) Prior Publication Data
US 2025/0012678 A1 Jan. 9, 2025

(30) Foreign Application Priority Data

Nov. 22, 2021 (CA) ...................................... 3140161

(51) Int. Cl.
*G01N 1/14* (2006.01)
*F04F 10/00* (2006.01)
(52) U.S. Cl.
CPC .............. *G01N 1/14* (2013.01); *F04F 10/00* (2013.01)
(58) Field of Classification Search
None
See application file for complete search history.

(56) References Cited

U.S. PATENT DOCUMENTS

| | | | |
|---|---|---|---|
| 4,232,694 A | 11/1980 | Williams | |
| 4,415,011 A | 11/1983 | Grant | |
| 5,199,398 A | * 4/1993 | Nylund | F02M 43/04 |
| | | | 123/304 |
| 5,487,431 A | * 1/1996 | Webb | E21B 49/081 |
| | | | 175/58 |
| 2011/0197974 A1 | 8/2011 | Menear | |

(Continued)

FOREIGN PATENT DOCUMENTS

GB 332796 A * 7/1930 .............. F04F 10/00

OTHER PUBLICATIONS

Canadian International Searching Authority, International Search Report mailed Jan. 13, 2023, International Patent Application No. PCT/CA2022051710, 4 Pages.

(Continued)

*Primary Examiner* — Suman K Nath
(74) *Attorney, Agent, or Firm* — Baumgartner Patent Law, LLC; Marc Baumgartner

(57) ABSTRACT

A liquid sampler is provided for collecting a sample of a liquid, the liquid sampler comprising: a tube which includes a proximal end and a distal end, and a bore therebetween; a resilient member which is removably housed in the bore; a first plug which is attached to a distal end of the resilient member; at least a second plug which is attached to the resilient member, proximally to the first plug; and a grip which is attached to a second end of the resilient member, wherein one or more of the second plug and grip extend outward from the distal end and the proximal end respectively, in use.

15 Claims, 13 Drawing Sheets

(56)     References Cited

U.S. PATENT DOCUMENTS

| | | |
|---|---|---|
| 2013/0145867 A1 | 6/2013 | Michelin |
| 2013/0192689 A1 | 8/2013 | Yoshida |
| 2013/0255403 A1* | 10/2013 | Dixon ..................... G01N 1/08 |
| | | 73/863.23 |
| 2016/0123142 A1 | 5/2016 | Cordry |
| 2017/0241263 A1 | 8/2017 | Heller |
| 2019/0250074 A1 | 8/2019 | Binod |
| 2020/0116599 A1 | 4/2020 | Kim |
| 2020/0378251 A1 | 12/2020 | Mcadam |

OTHER PUBLICATIONS

Canadian International Searching Authority, Written Opinion of the International Searching Authority mailed Jan. 13, 2023, International Patent Application No. PCT/CA2022051710, 6 Pages.
Safe-T Syphon, retreived from www.aircraftspruce.ca/catalog/eppages/05-22001.php?gclid=EAlalQobChMlwr_nqtCR6wIVKRitBh3kmAGIEAQYAyABEgKOZPD_BwE, on Nov. 1, 2021, 1 page.

* cited by examiner

18

12

14

16

22

LIQUID SAMPLER, LOW HEADSPACE SYPHON AND METHOD OF USE THEREOF

CROSS REFERENCE TO RELATED APPLICATIONS

The present invention is filed under 35 U.S.C. § 371 as the U.S. National Phase of International Application No. PCT/CA2022/051710, filed Nov. 21, 2022, which designated the U.S. and claims priority to Canadian Patent Application Serial No. 3140161 entitled "LIQUID SAMPLER, LOW HEADSPACE SYPHON AND METHOD OF USE THEREOF" filed on Nov. 22, 2021, both of which are hereby incorporated in their entirety including all tables, figures, and claims.

FIELD

The present technology is an easy to use, portable liquid sampler. More specifically, it is a water sampler that is configured to collect and retain multiple samples at a range of depths. It is also a syphon that can be primed in a minimal depth of liquid. More specifically, it is a syphon that includes a tube and an elongate member which is removably housed in the tube and is attached to at least one plug.

BACKGROUND

Liquid samplers are used for collecting waster samples from various bodies of water, including lakes, streams, oceans, holding ponds, wells, tanks, and the like. Most are cumbersome and not easily transportable. Further, the sample must be decanted into a container before it is transported or another sample taken. For example, United States Patent Application Publication No. 20200378251 discloses a liquid sampler for use in sampling the liquid in a well. The sampler has a tube for containing the sample and an inlet at the bottom and an outlet at the top. An inlet check valve is located at the inlet which has a door configured autonomously to move between open and closed configurations in response to fluid flow through the inlet. In the open configuration, the door is aligned with the axis of the tube to allow fluid to flow into the tube through the inlet from below, and in the closed configuration, the door is positioned transverse to the axis of the tube to block fluid flow from the tube out through the inlet thereby retaining fluid within the tube as the sampler is raised up. This does not have the capability of storing the liquid samples and must discharge the liquid sample into a sample bottle before being able to collect another sample. Only one sample can be collected at a time. This also does not allow for collection at a specific depth, as the opening remains open.

United States Patent Application Publication No. 20200116599 discloses an automatic water sampler that comprises: a driving unit operated according to the pressure measured by a pressure sensor; a driving magnet approaching a driven magnet according to the operation of the driving unit; and a first wire unlocked by a control rod according to the movement of the driven magnet. The present invention can provide an automatic water sampler, which improves inaccuracy due to conventional interference of an ocean current, flow velocity, and the like, and manual water sampling by depth by automatically sampling water at the correct depth recognized through a pressure sensor, thereby enabling reliability and accuracy of a sample to be ensured and sampling expenses to be remarkably reduced. The device is overly complex.

United States Patent Application Publication No. 20190250074 discloses a water sampling device that has a rigid body, a top lid, extension members, a horizontal member, a spring, a rod, at least one polymer membrane and a bottom lid. The top lid has a shaft attached to it and the shaft traverses through the horizontal member. The bottom lid is connected to the rod upon which the at least one polymer membrane is attached perpendicularly. The water sampling device undergoes two different stages of lid opening and closing while in operation of collecting water sample to concentrate diversified bacteria from different water depths. The top lid, the shaft and the spring co-operate with the rigid body and the horizontal member such that in a first state, the top lid seals the top end opening while in a second state allows fluid to flow to an inside portion of the rigid body. This does not have the capability of storing the liquid samples and must discharge the liquid sample into a sample bottle before being able to collect another sample. Only one sample can be collected at a time.

United States Patent Application Publication No. 20170241263 discloses a water sampling assembly for sampling water within a groundwater production well includes a primary pump and a water sampler. The primary pump is positioned within the groundwater production well. Additionally, the primary pump defines at least a portion of an annulus between the primary pump and one of the support casing and the well screen. The water sampler is configured to obtain a plurality of water samples from the groundwater production well without removal of the water sampler from the groundwater production well. Additionally, the water sampling assembly can further include a flow detection assembly that is conjoined with the water sampler within a single jacket to form a conjoined system. The flow detection assembly is configured to detect a flow, i.e. a dynamic flow and/or an ambient flow, of the water within the groundwater production well. This is an installation.

United States Patent Application Publication No. 20160123142 discloses a no purge sampler for collecting fluid samples includes a flexible tube having a sealed first end and a second end, the tube defining an interior cavity, a check valve disposed at the second end of the tube, and at least one aperture above the check valve. To collect fluid samples, the no purge sampler is lowered into the fluid to be sampled. The at least one aperture streamlines the tube as it is lowered into the fluid reducing drag-down and mixing. Once the sampler reaches the desired depth, the sampler is pulled upwards allowing fluid to enter the interior cavity. The sampler is then pulled out of the fluid without losing any of the fluid in the interior cavity of the tube or contaminating the sample with any extraneous fluid. It does not have the capability of storing the liquid samples and must discharge the liquid sample into a sample bottle before being able to collect another sample. Only one sample can be collected at a time. This also does not allow for collection at a specific depth, as the opening remains open.

United States Patent Application Publication No. 20130145867 discloses a water sampling system, device and method of sampling. Water sampling system includes triggering mechanism, at least one water sampling device and pumping mechanism. Water sampling device is configured to cooperate with triggering mechanism and includes removable sampling container and pinch mechanism. Removable sampling container is disposed in water sampling device and includes inlet, inlet tube and sampling bag attached to inlet tube. Pinch mechanism is located adjacent to and surrounding inlet tube and proximate to sampling bag. Pinch mechanism, when closed, prevents water from entering inlet tube and sampling bag. Pinch mechanism, when open, allows water from inlet into inlet tube and sampling bag. Pumping mechanism creates a flow of water to cause sampling bag to collect water when pinch mechanism is in an open position. The device is overly complex.

U.S. Pat. No. 4,415,011 discloses a sample collector that includes a control circuit that initiates the sampling at preset time intervals or each time a preset volume of liquid has flowed past the collector as indicated by a flow meter. To control the volume of each sample, an optical liquid inter- face detector within the flow passage of the sample collector initiates counting of the revolutions of the pump and after a pre-selected number of counts, the control circuit terminates the pumping. The optical liquid interface detector includes a light-emitting diode on one side of the flow passage and a phototransistor on the opposite side to detect the interface of the liquid. This requires a pump to pump the liquid. It does not have the capability of storing the liquid samples and must discharge the liquid sample into a sample bottle before being able to collect another sample. Only one sample can be collected at a time. There are many different types of syphons for moving liquid from one level to another. For example, United States Patent Application Publication No. 20130192689 discloses a syphon tube that relies upon capillary action, thus it includes a section of lower inside diameter tubing between sections of higher inside diameter tubing. This requires that the container by inclined to increase the head space, which is not useful for syphoning fuel, spilled fluids or fluids contained in large vessels or equipment.

United States Patent Application Publication No. 20110197974 discloses a draining apparatus for use in discharging water from a cistern which is arranged for dual flush operation. The apparatus includes an inlet member (2), buoyancy altering means connected to the inlet member and an outlet (4) fluidly connected to an inlet of the inlet member by an adjustable conduit (5). The buoyancy altering means is operable to decrease the buoyancy of the inlet member thereby submerging, in use, at least a portion of the inlet and discharging water from the cistern. In one embodiment, the buoyancy altering means includes a buoyancy member (3) releasably latched to the inlet member for movement there- with. In another embodiment, the buoyancy altering means includes a buoyancy chamber with a valve operable to selectively release or retain air within the chamber. In a yet further embodiment, the buoyancy altering means includes flow altering vanes at or adjacent the inlet arranged to alter, in use, the direction and/or flow rate of the water passing through the inlet thereby to reduce the effective buoyancy of the inlet member. This is a large and complex apparatus.

CN20278977 discloses a siphon liquid-sucking device, especially a transfusion tool which can start the siphon to suck liquid by hands instead of a mouth. The siphon liquid-sucking device comprises a liquid inlet flexible pipe, a unidirectional control valve, an elastic air bag, a unidirec- tional control valve, a liquid outlet flexible pipe, which are connected in order. The unidirectional control valve is composed of a light rubber ball and a compressed spring assembly. The liquid sucking of the siphon can be started by manually pinching the elastic air bag. The siphon liquid- sucking device is advantageous in that the problem of using a conventional siphon flexible pipe that mouth sucking may bring harm to human health can be resolved, and the operation is convenient; the unidirectional control valve is composed of the light rubber ball and the compressed spring assembly, and thereby sealing performance is strong and durability is good.

U.S. Pat. No. 4,232,694 discloses a siphon that is formed of a long transparent main siphon tube having a distal end for insertion in a tank from which fluid is to be siphoned and having a proximal end. A smaller diameter transparent connection tube fits tightly within the main siphon tube at a proximal end but slides freely from the main siphon tube. An evacuating pump has a nipple connected to the inlet end, and the nipple fits tightly within a proximal end of the connec- tion tube. After the distal end of the main siphon tube is placed in a tank, one pulls once or more on the plunger of the pump while gripping the proximal end of the main siphon tube and thus holding the connection of the main siphon tube and the connection tube. When fluid raises to a desired level in the siphon tube, a continued outward pull on the plunger past its normal limits and a simultaneous loos- ening of the grip on the proximal end of the siphon tube causes withdrawal of the pump and connection tube from connection with the main siphon tube, permitting the fluid to freely flow from the proximal end of the main siphon tube.

https://www.aircraftspruce.ca/catalog/eppages/05- 22001.php?gclid=EAlalQobChMlwr_ngtCR6wIVKRitBh 3kmAGIEAQYAyABEgKOZPD BwE discloses that the Safe-T Syphon is a hose that was developed and is manu- factured in the USA. It's simple and safe. Simple because it relies on an unfailing natural principal for its operation and has no complex moving parts. It's safe because the 6 foot hose is made of non-static material avoiding any chance of arcing or sparking, so it can even be used with high octane fuels. The Safe-T Syphon does not need to be placed in the mouth in order to prime it, so there is no danger of swallowing any liquid or inhaling any vapors of the liquid to be transferred: just jiggle it up and down to establish the flow.

The Safe-T Syphon works with a ½ inch hose and the "pump" is made from copper tubing with a glass marble. This makes it ideal for high capacity siphoning of almost any liquid, including fresh and salt water, gasoline, diesel fuel, oil, etc. This syphon cannot function in a minimal depth of liquid as it must be agitated up and down. If the headspace of liquid is insufficient, an airlock will occur.

What is needed is a liquid sampler that is simple to operate and allows for collection of multiple samples at different depths or locations. It would be preferable if the sampler was not affected by the ambient pressure. It would be preferable if the sampler could operate equally in 2 ft depth to 5000 ft depth. It would be preferable if samples could be stored in the sampler and that the sampler was easily transported. It would be preferable if the sampler could be provided as either an automated sampler or a user operated sampler. It would be preferable if the sample volume of the sampler could be modified allowing for a wide range of sample volumes to be collected. It would be further preferable if sample collection was highly repeatable.

What is also needed is a syphon and sampler for liquids that can be primed in a minimal depth of water. It would be preferable if the syphon was pumpless. It would be further preferable if it was a self-contained unit. It would be further preferable if it was compact and easy to store. It would be preferable if it included a C-clamp for attaching the tubing to the container or vessel being drained. It would be pref- erable if it was able to syphon substantially all the volume of liquid in the container being drained. It would be pref- erable if it was scalable.

SUMMARY

The present technology is a liquid sampler that is simple to operate and allows for collection of multiple samples at different depths or locations. The sampler is not affected by the ambient pressure. The sampler can operate equally in 2 ft depth to 5000 ft depth. One or more samples can be stored in the sampler and easily transported in the sampler. The sampler can be provided as either an automated sampler or a user operated sampler. The sample volume of the sampler can be modified allowing for a wide range of sample volumes to be collected. Sample collection is highly repeatable.

In one embodiment, a liquid sampler is provided for collecting a sample of a liquid, the liquid sampler comprising: a tube which includes a proximal end and a distal end, and a bore therebetween; a resilient member which is removably housed in the bore; a first plug which is attached to a distal end of the resilient member; at least a second plug which is attached to the resilient member proximally to the first plug; and a motor in motive communication with the resilient member.

The liquid sampler may further comprise a controller in electronic communication with the motor.

In another embodiment, a liquid sampler is provided for collecting a sample of a liquid, the liquid sampler comprising: a tube which includes a proximal end and a distal end, and a bore therebetween; a resilient member which is removably housed in the bore; a first plug which is attached to a distal end of the resilient member; at least a second plug which is attached to the resilient member proximally to the first plug; and a grip which is attached to a second end of the resilient member, wherein the grip extends outward from the proximal end.

In the liquid sampler, the first plug and the at least second plug may each include a sealing lip with an undercut above the lip and an undercut below the lip.

In the liquid sampler, the plugs may be polytetrafluoroethylene.

In the liquid sampler, the resilient member may be a wire that is at least a 150 pound test wire.

In the liquid sampler, the resilient member may be a rod.

In the liquid sampler, the bore may have a diameter of one centimeter to 15 centimeters.

In the liquid sampler, there may be a chain of plugs.

The liquid sampler may further comprise a removable housing which houses the tube.

The liquid sampler may further comprise a threaded shaft proximate to each of the distal end and the proximal end of the tube.

The liquid sampler may further comprise threaded caps that threadedly, releasably thread with the threaded shafts.

In another embodiment, a method of sampling a liquid in a body of liquid is provided, the method comprising: providing a liquid sampler, the liquid sampler including a tube which includes a proximal end and a distal end, and a bore therebetween, a resilient member which is removably housed in the bore, a first plug which is attached to a first end of the resilient member, at least a second plug spaced a distance apart from the first plug on the resilient member, and either a hand grip or a winch at the proximal end; immersing the tube in a body of liquid; urging the resilient member along the bore to draw the plugs into the bore; and collecting the liquid in the tube.

In the method, the liquid sampler may include a chain of plugs spaced along the resilient member, and the method comprises collecting at least two liquid samples.

The method may further comprise capping both the distal end and the proximal end of the tube.

The present technology is also a syphon that can be primed in a minimal depth of water. It is pumpless. It is a self-contained unit. It is compact and easy to store. It includes a C-clamp for attaching the tubing to the container being drained. It can syphon substantially all the volume of liquid in the container being drained. It is scalable and can be manufactured with different inside diameter tubing and in different lengths.

In one embodiment, a syphon for removing liquid from a body of liquid is provided, the syphon comprising: a tube which is a U-shaped tube or a flexible tube and includes a proximal end and a distal end, and a bore therebetween; a resilient member which is removably housed in the bore and is bendable; a plug which is attached to a first end of the resilient member; and a grip which is attached to a second end of the resilient member, wherein one or more of the plug and grip extend outward from the distal end and the proximal end respectively, in use.

In the syphon, the plug may include a lip with an undercut above the lip and an undercut below the lip.

In the syphon, the plug may be a polytetrafluoroethylene plug.

In the syphon, the resilient member may be a wire that is at least a 150 pound test wire.

In the syphon, the bore may have a diameter of at least about 6 millimeters.

In the syphon, the tube may be flexible and has a Shore A durometer rating of about 55 to about 75.

In the syphon, the tube may have a Shore A durometer rating of about 70.

In the syphon, the distal end may be angled at an angle of about 45 degrees.

In the syphon, the grip may be a finger grip and may include surface contours.

In another embodiment, a method of removing a liquid from a body of liquid is provided, the method comprising: providing a very low head space syphon which includes a tube which includes a proximal end and a distal end, and a bore therebetween, a resilient member housed in the tube, a plug attached to a first end of the resilient member, and a finger grip, the finger grip attached to a second end of the resilient member; ensuring that the plug is slidably housed in the bore proximate the distal end; placing the distal end of the tube in the body of liquid; holding a proximal end of the tube below the level of the proximal end; drawing the plug through the tube with the finger grip; and removing the plug from the tube thereby removing the liquid from the body of liquid.

In another embodiment, a method of priming a syphon is provided, the method comprising: providing a very low head space syphon which includes a tube which includes a proximal end and a distal end, and a bore therebetween, a resilient member housed in the tube, a plug attached to a first end of the resilient member, and a finger grip, the finger grip attached to a second end of the resilient member; ensuring that the plug is slidably housed in the bore proximate the distal end; placing a distal end of the syphon in the body of liquid; holding a proximal end of the syphon below the level of the proximal end; and drawing the plug through the tube with the finger grip, thereby priming the syphon.

FIGURES

7

Figure 4A:
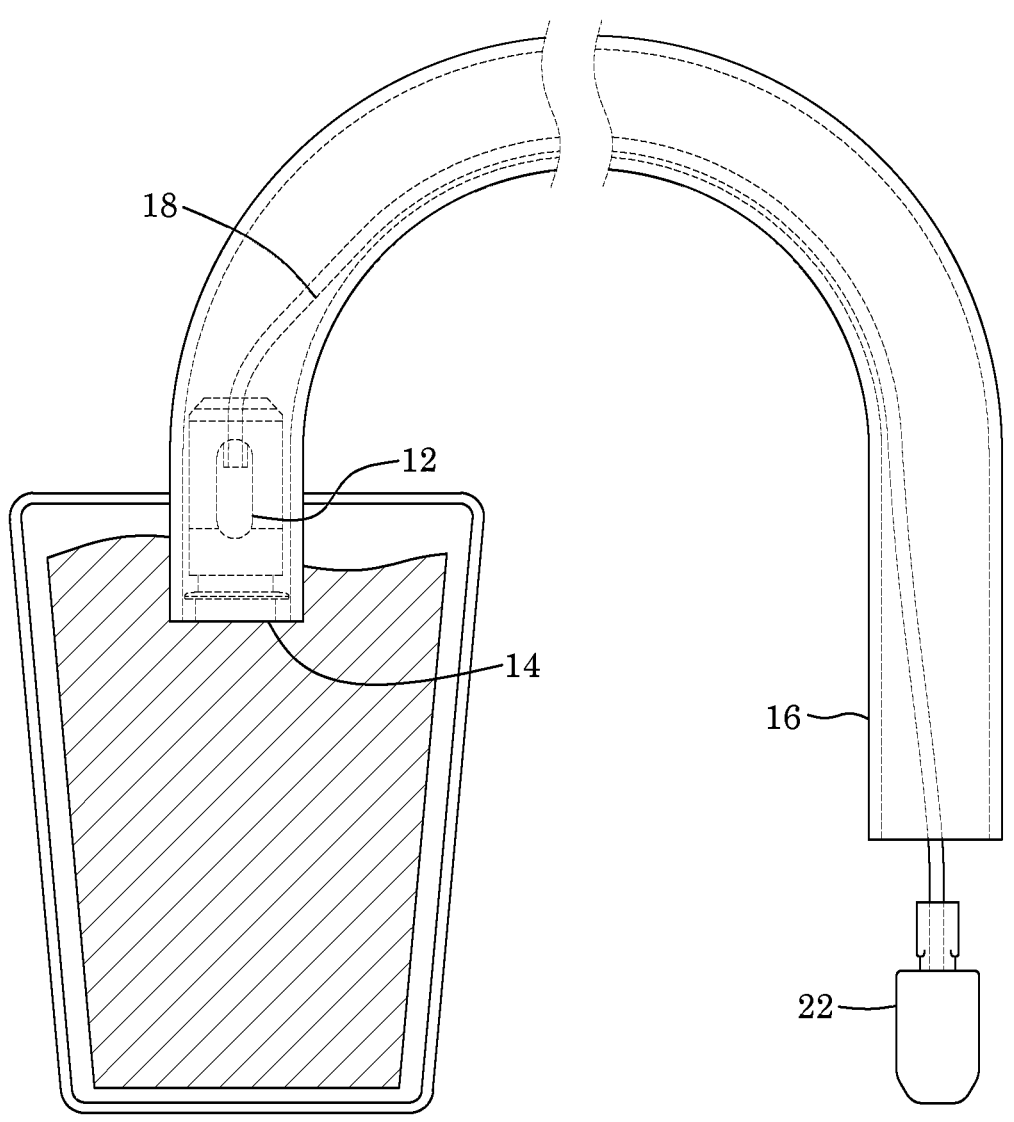
Figure 4B:
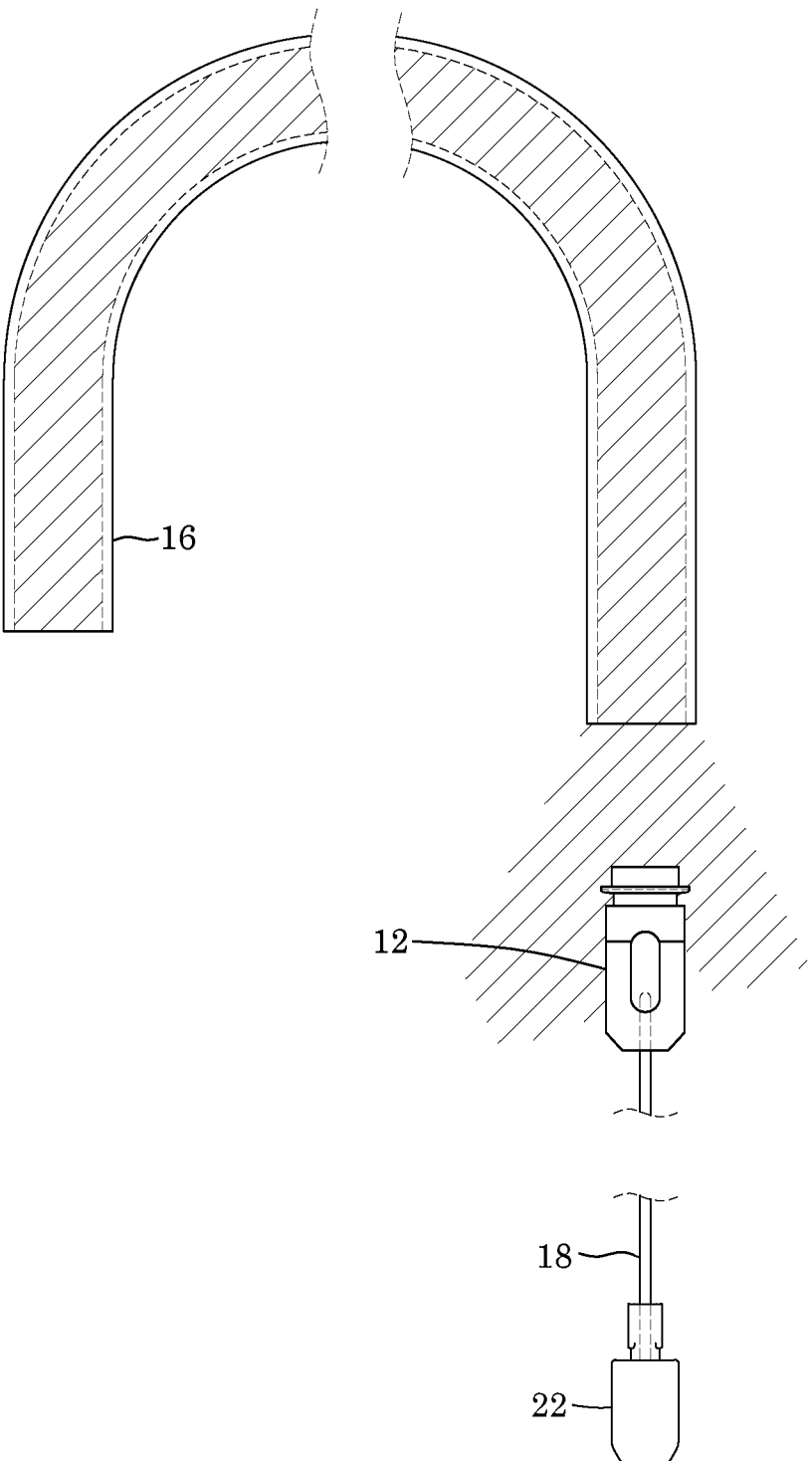

FIG. 4A shows the syphon in the liquid to be syphoned; and FIG. 4B shows the plug pulled out of the tube and the water being released.

Figure 5:
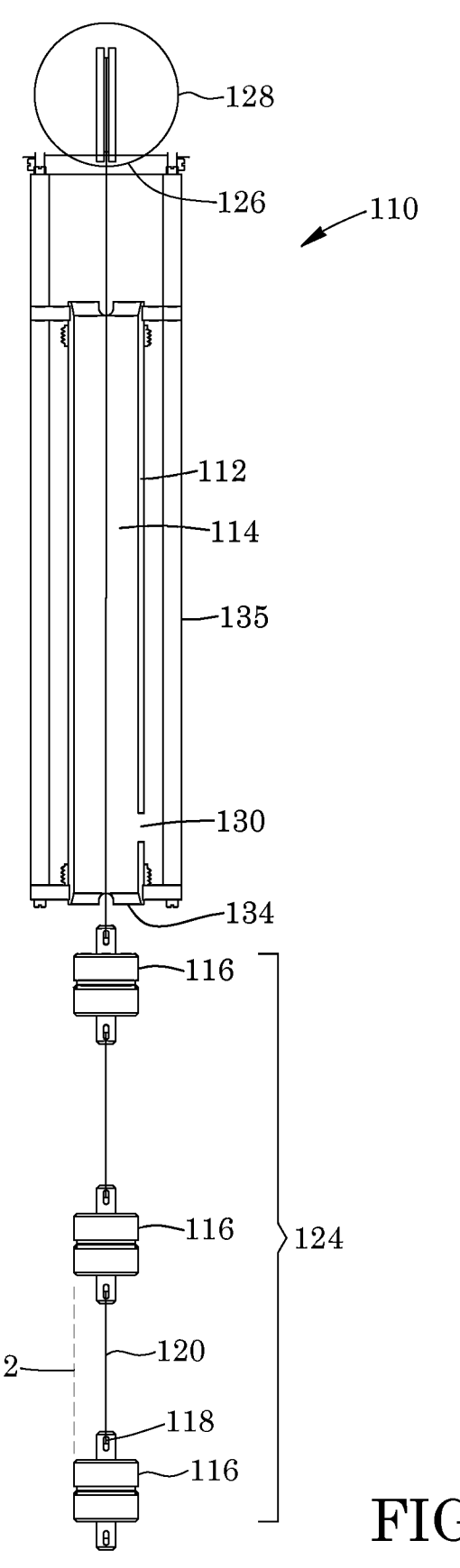

FIG. 5 is a longitudinal sectional view of the liquid sampler of the present technology.

Figure 6A:
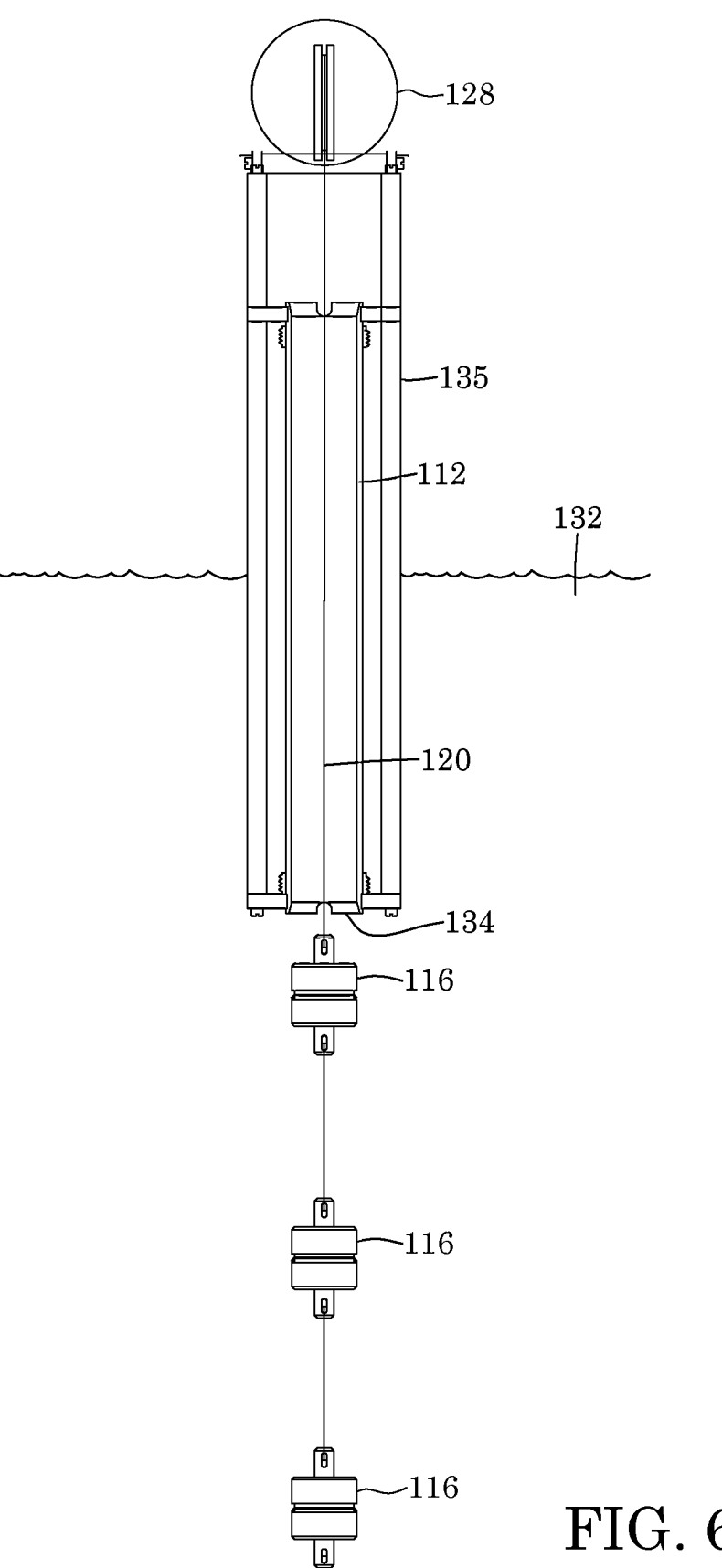
Figure 6B:
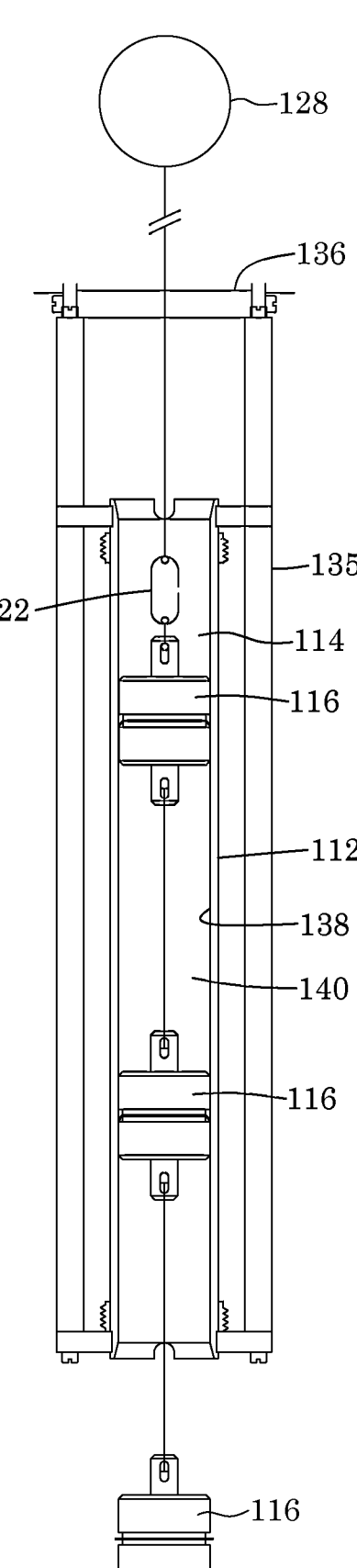
Figure 6C:
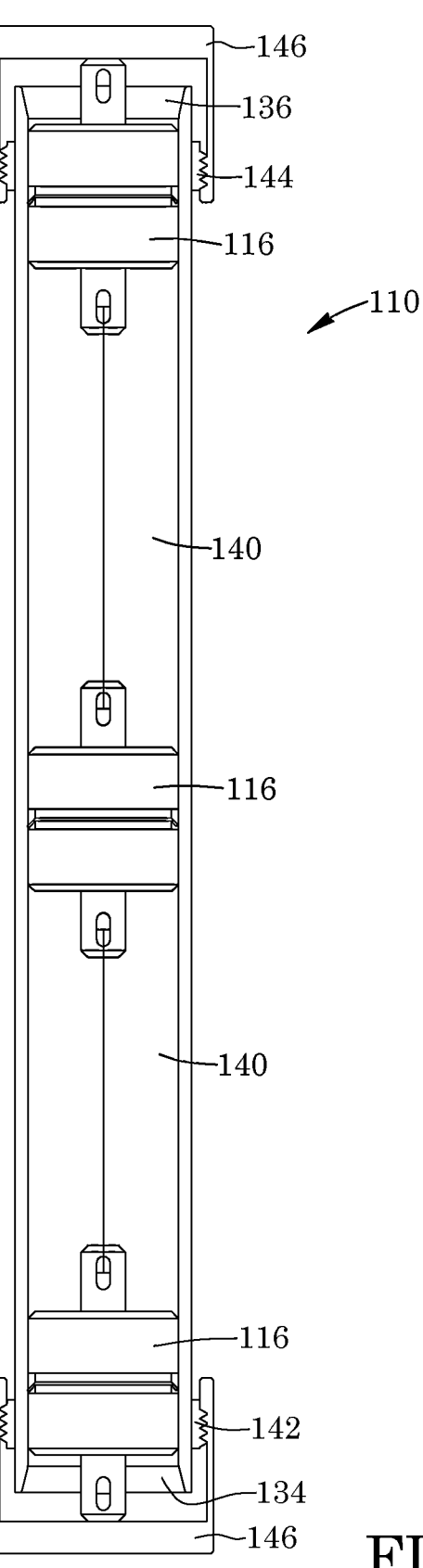

FIG. 6A shows the liquid sampler in the liquid to be liquid sampled; FIG. 6B shows the most proximal plug being drawn into the bore; and FIG. 6C shows the liquid sampler ready for transport.

Figure 7:
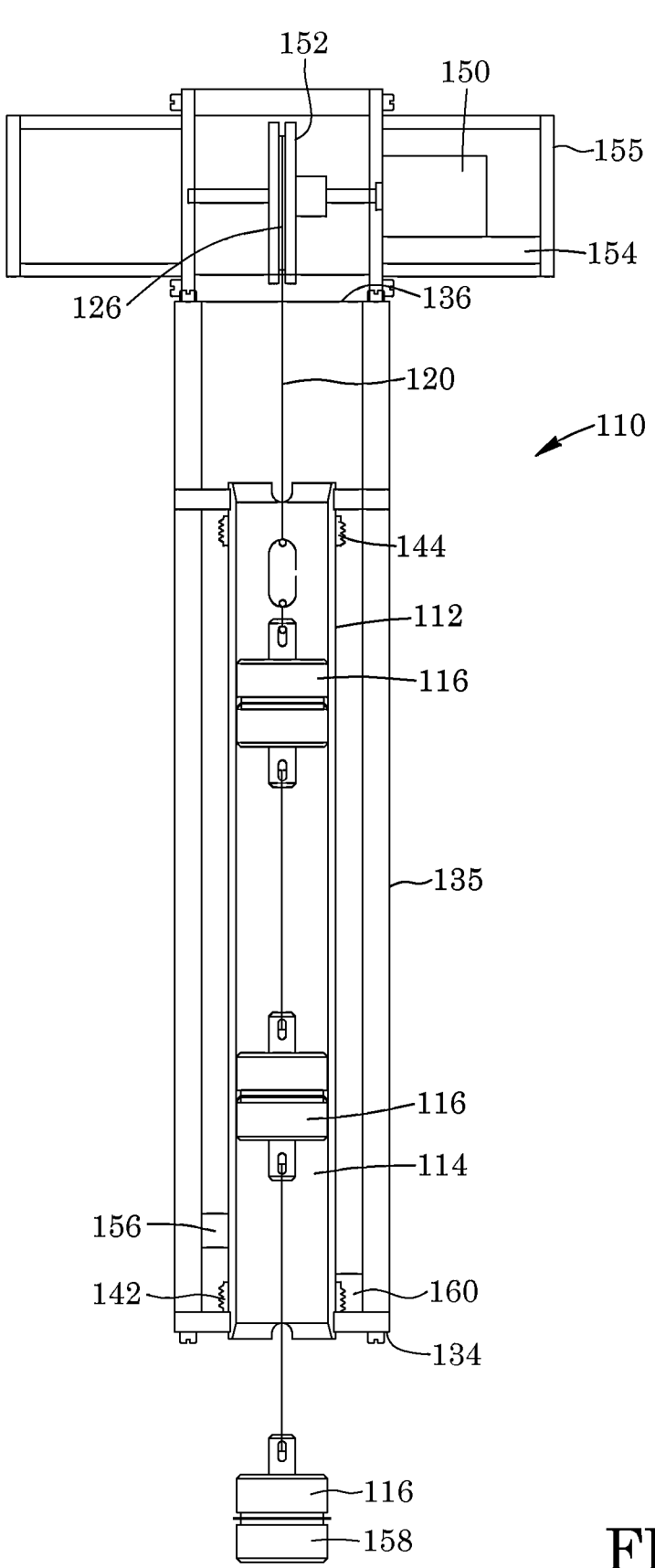

FIG. 7 is a schematic of an automated liquid sampler.

Figure 8:
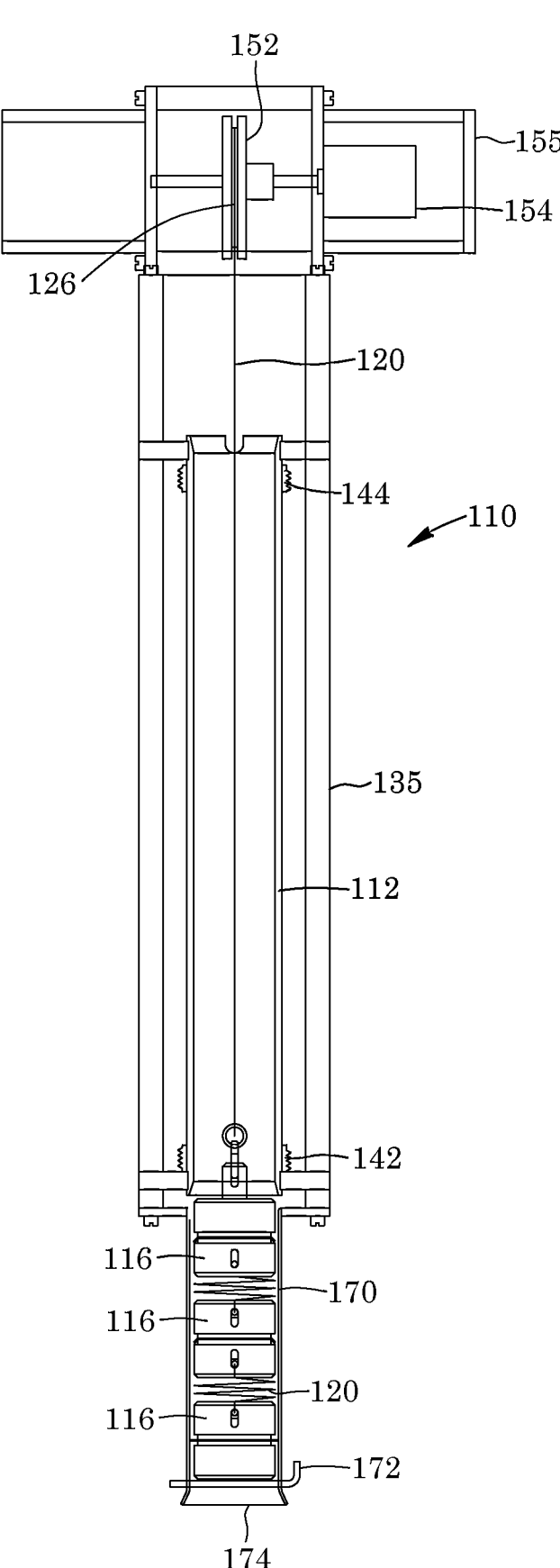

FIG. 8 is a schematic of an alternative embodiment liquid sampler.

Figure 9:
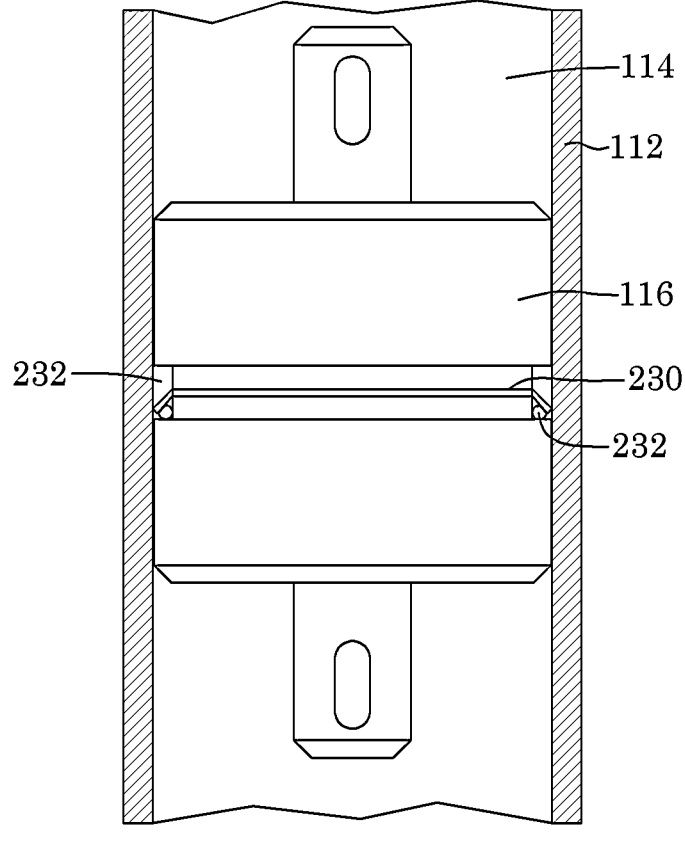

FIG. 9 is a side view of the plug of the liquid sampler of FIG. 5 in use, showing the bent lip.

Figure 10:
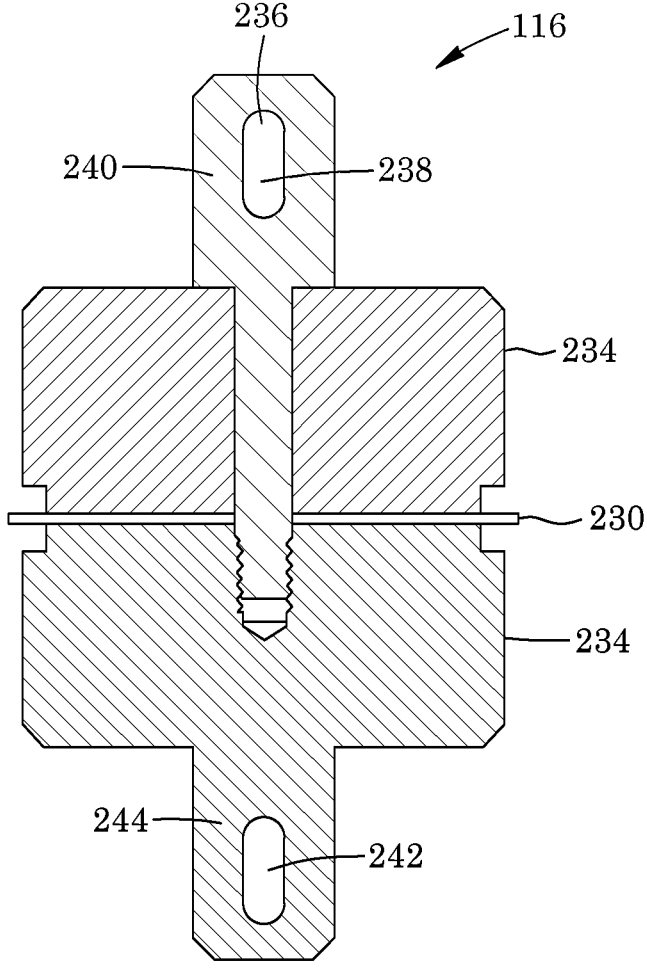

FIG. 10 is a longitudinal sectional view of an alternative embodiment of the plug.

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

Resilient member—in the context of the present technology a resilient member is an elongate member that does not buckle under compressive forces when constrained by the wall of the tubing in which it is housed.

Resilient and bendable member—in the context of the present technology, a resilient and bendable member is an elongate member that does not buckle under compressive forces when constrained by the wall of the tubing in which it is housed but can be bent.

U-shaped tube—in the context of the present technology, a generally U-shaped tube is a tube that defines a U shape overall but may include a coil or a plurality of coils along the length.

DETAILED DESCRIPTION

Figure 1:
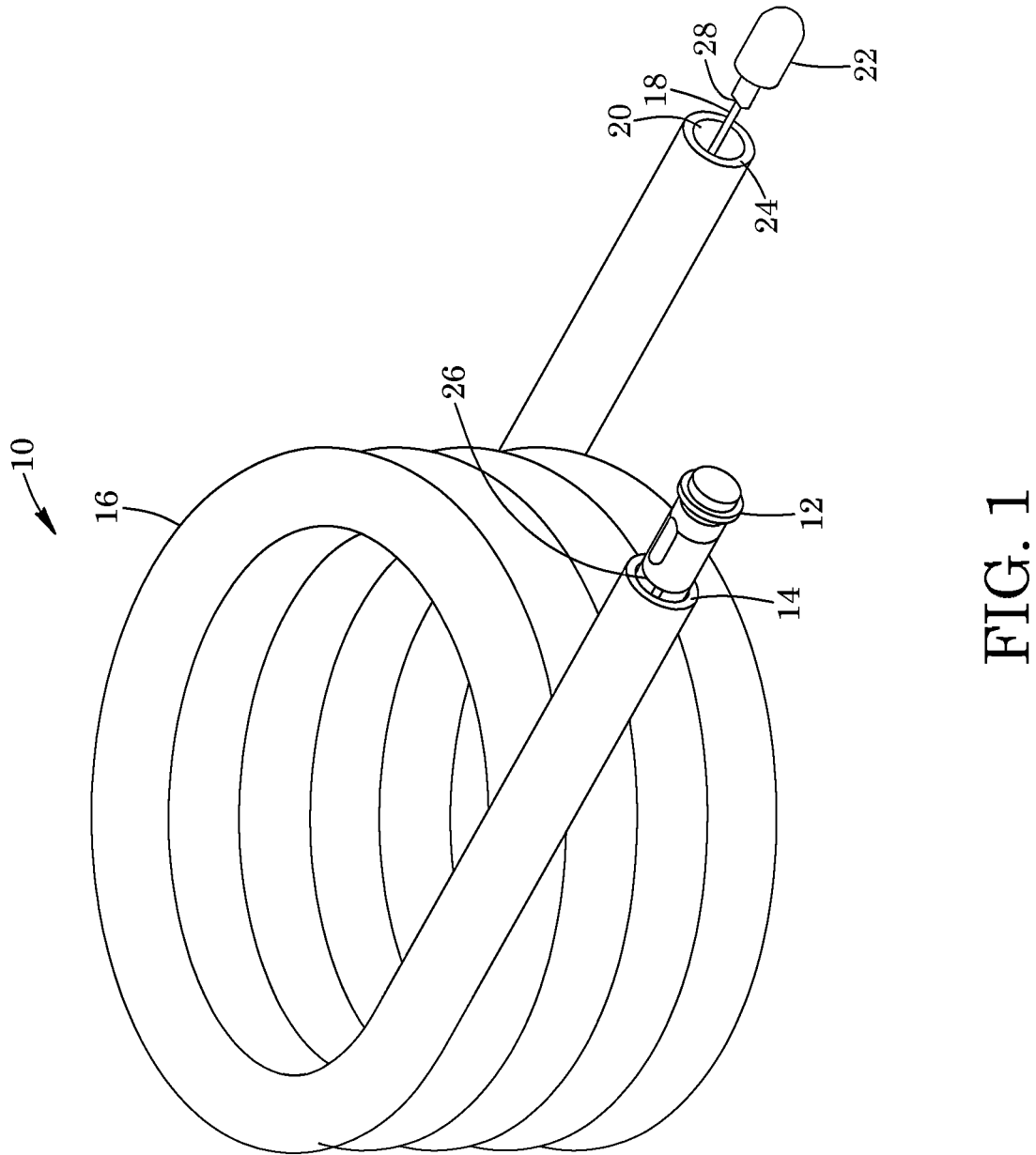
FIG. 1 is a perspective view of the syphon prior to use or when stored.

A syphon, generally referred to as 10 is shown in FIG. 1. A plug 12 is at a distal end 14 of a tube 16. The tube is preferably polyethylene tube with a wall thickness of at least about 1.5 mm to about 6 mm. The inside diameter is about 6 mm to about 2 cm. The tube 16 preferably has a Shore A durometer rating of about 55 to about 75, preferably 70, and is flexible enough to form a U-shape. The tube 16 can be up to about 3.7 meters long. A resilient member 18 extends through the bore 20 of the tube 16 between the plug 12 and a finger grip 22. The finger grip 22 extend a sufficient distance from the proximal end 24 of the tube 16 to be grasped. In one embodiment, the plug 12 is substantially housed within the bore 20 of the tube 16 and does not extend out from the distal end 14 of the tube 16. In another embodiment, both the plug 12 and the finger grip 22 extend from the tube 16. In yet another embodiment, the plug 12 extends a sufficient distance from the distal end 14 to be grasped and pushed in. In the storage position, the resilient member 18 may remain entirely in the bore 20 of the tube 16 or may extend beyond the tube 16. The distal end 14 of the tube 16 is angled at up to a 45 degree angle. The plug 12 is at the distal end 26 of the resilient member 18 and the finger grip is at the proximal end 28 of the resilient member 18.

The finger grip 22 is preferably a plastic polymer that, when moved through the bore 20, has a low coefficient of friction. In one embodiment, the finger grip 22 is the plastic polymer, polyoxymethylene homopolymer, commonly known as Delrin®. The plug 12 is preferably polytetrafluoroethylene, commonly known as Teflon®.

In another embodiment, the finger grip 22 is a metal slug that is crimped onto the proximal end 28 of the resilient member 18.

The resilient member 18 is preferably a wire that has sufficient stiffness to be pushed through the bore 20 but has sufficient flexibility to be bent. The resilient member may be for example, but not limited to wire that is at least about 150 pound test strength and is preferably 180 pound test strength. As the tube 16 can be bent into at least a U shape, and preferably into at least one coil, the resilient member 18 preferably can be bent into a U shape, and preferably into at least one coil, when housed in the tube 16.

In an alternative embodiment, the resilient member 18 is a plastic polymeric line that has sufficient stiffness to be pushed through the bore 20 but has sufficient flexibility to be bent in a U-shape. Preferably, the resilient member 18 can be bent in at least one coil.

In another alternative embodiment, the resilient member 18 is a strap, which may be a plastic polymeric material or a metal that has sufficient stiffness to be pushed through the bore 20 but has sufficient flexibility to be bent. Preferably, the resilient member 18 can be bent in at least one coil.

Figure 2:
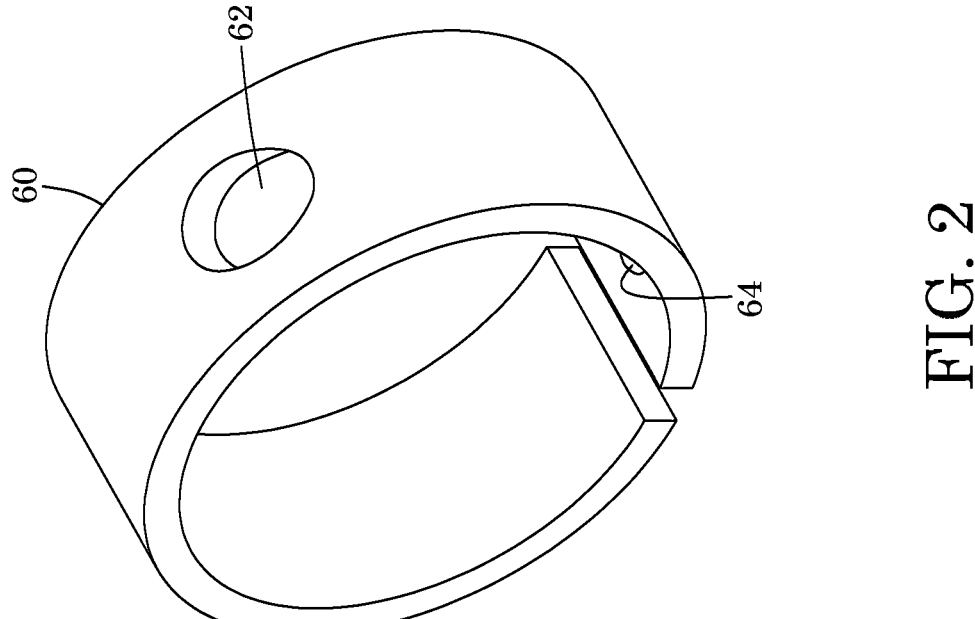
FIG. 2 is a perspective view of the C-clamp.
Figure 3:
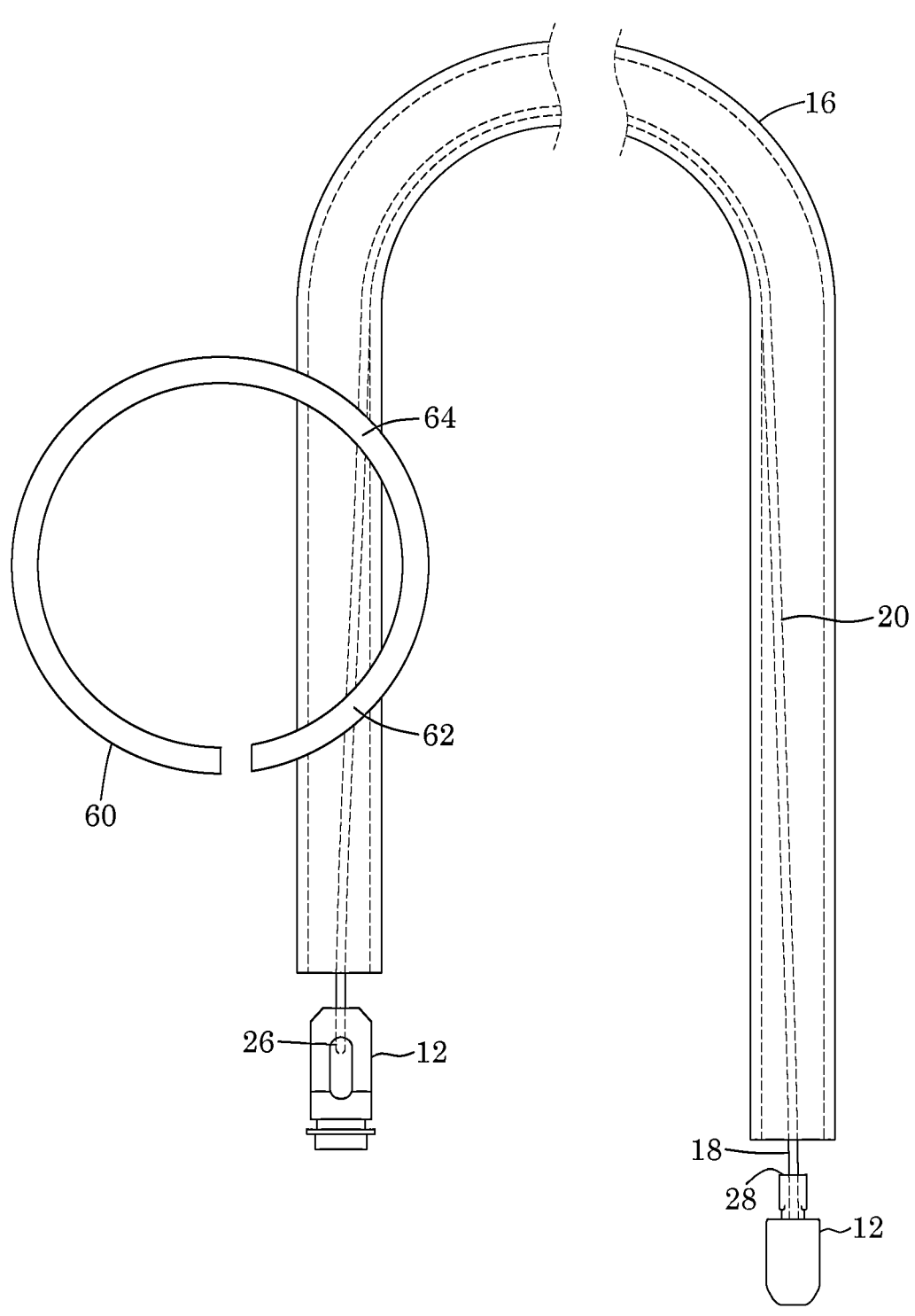
FIG. 3 is a side view of the C-clamp with the tube in place.

As shown in FIG. 2, a C-clamp 60 is made from a flexible plastic polymer and includes two apertures 62, 64. As shown in FIG. 3, the tube 16 extends through the apertures 62, 64 and the C-clamp clamps onto the container being sampled. This allows a user to operate the syphon 10 autonomously.

As shown in FIG. 4A, when a user places the distal end 14 in the liquid to be syphoned, the liquid level need only cover the distal end 14. As shown in FIG. 4B, when the distal end 26 is above the level of the proximal end 24, the user withdraws the plug 12 and the liquid starts to flow through the bore 20.

The details of the plug 12 are shown in FIGS. 9 and 10 and described in relation to FIGS. 9 and 10, using the plug 116 as an example.

A liquid sampler, generally referred to as 110 is shown in FIG. 5. The tube 112 is preferable glass and has a bore 114 with a diameter of about one centimeter to about fifteen centimeters or more and is about 40 centimeters to about 150 centimeters long. There are at least two plugs 116, and one is terminally located on the distal end 118 of the resilient member 120, and one is a predetermined distance 122 from the distal end 118. If multiple water samples are desired, there may be a chain of plugs, generally referred to as 124. In one embodiment the proximal end 126 of the resilient member 120 is a grip 128 to allow a user to easily draw the resilient member 120 through the bore 114. An aperture 130 is located proximate to the distal end 134 of the tube 112. A removable housing 135 surrounds the tube 112 and protects it.

As shown in FIG. 6A the tube 112 is placed in the body of liquid 132, which may be water, to be sampled. The proximal most plug 116 is preferably located proximate the distal end 134 of the tube 112. As shown in FIG. 6B when the grip 128 is urged away from the proximal end 136 of the tube 112, the liquid 132 is drawn into the bore 114 in discrete samples 140 as they are trapped between the inner surface 138 of the tube 112 and the plugs 116. Multiple samples 140 of the liquid 132 can be collected by adding multiple plugs 116. If automated, as shown in FIG. 7, the tube 112 may be detached from the automation components by disconnecting the grip which is a shackle 22 connecting the resilient member 120 to the motor winding drum wire cable.

The samples 140 may be transported in the tube 112 before being decanted from the bore 114 of the tube 112. The liquid samples 140 can be decanted by positioning the detached collection tube 112 on slight incline to the horizontal and pulling on the resilient member 120 thus drawing the plugs 116 out and allowing the liquid to be released in a controlled manner. The samples 140 can then be analyzed. FIG. 6C shows the liquid sampler 110 ready for transport. Proximate to the distal end 134 and the proximal end 136 of the tube 112 are threaded shanks 142, 144. These shanks 142, 144 mate with threaded caps 146, ensuring that the samples are safely retained.

In one embodiment the resilient member 120 is non-compliant and may be, for example, but not limited to a rod.

The liquid sampler 110 may be automated. As shown in FIG. 7, a motor 150 is located proximate to the proximal end 136 of the tube 112. It is in electrical communication with a winch 152 which in turn is attached to the proximal end 126 of the resilient member 120 by a grip 22, which in this case is a shackle. A controller 154 is in electronic communication with the motor 150. A housing 155 protects the motor 150, controller 154 and power supply. The controller 154 is also in electronic communication with a pressure sensor 156. The pressure sensor 156 may be a piezoelectric pressure sensor which is configured to measure water pressure in order to determine the depth at which sampling is taking place. In one embodiment, the plugs 116 include a magnet 158 and a Hall sensor 160 is located proximate to the distal end 134 of the tube 112. The controller 154 is in electronic communication with the Hall sensor 160, thus when a signal is sent from the Hall sensor 160 to the controller 154, the controller 154 controls the motor 150 such that the selected number of samples to be collected at the selected depth are collected. In an alternative embodiment, a motor turn-off actuation method is an electrical current sensor that senses an electrical current spike due to the increased power required to momentarily draw the plug 116 into the tapered distal end 134 of the collection tube 112. The motor is set to switch-off approximately ½ sec after the initial current spike.

In an alternative embodiment shown in FIG. 8, the liquid sampler 110 includes a receiver (magazine) 170 that retains the plugs 116 when not in use and provides an extension into the liquid to be sampled, when in use. This setup is used when the sampler 110 is utilized in a horizontal orientation. A key 172 holds the plugs 116 from dropping out of the distal end 174 of the receiver 170 and can remain in place during sample collection. The liquid sample 110 may be hand operated, as shown in FIG. 5, or may be automated, as shown in FIG. 3. The components shown in FIGS. 5-8 may be present in each embodiment, for example, but not limited to, the screw shanks 140, 142, the Hall sensor 160, the pressure sensor 156, the magnets 158, and the like.

As shown in FIG. 9 the plug 116 is made of Teflon® (polytetrafluoroethylene) and has a lip 230 with an undercut 232 above it and below it. The lip 230 ensures that the plug 116 fits snugly in the bore 114 to create suction when it is drawn through the bore 114. The undercuts 132 and the Teflon allow the lip 230 to fold over as it drawn through the bore 114. Without being bound to theory, the plasticity of the lip 230 provides a high tolerance and allows for non-circularity of the tube 112 and greater tolerance to the inside diameter of the tube 112.

In another embodiment the plug 116 has a groove with an O-ring. The O-ring ensures that the plug 116 fits snugly in the bore 114 to create suction when it is drawn through the bore 114. In one embodiment the O-ring is a double-acting four lip seal, commonly called a Quad-ring®.

As shown in FIG. 9 the plug 116 is made of Teflon® (polytetrafluoroethylene) and has a sealing lip 230 with an undercut 232 above it and below it. The lip 230 ensures that the plug 116 fits snugly in the bore 114 to create suction when it is drawn through the bore 114. The undercuts 132 and the Teflon allow the lip 230 to fold over as it drawn through the bore 114. Without being bound to theory, the plasticity of the lip 230 provides a high tolerance and allows for non-circularity of the tube 112 and greater tolerance to the inside diameter of the tube 112.

As shown in FIG. 10 in an alternative embodiment, the plug 116 and sealing lip 230 can be made from three pieces comprising two outer members 234 sandwiching a slightly larger diameter thin foldable polytetrafluoroethylene sealing lip 230. A screw 236 with an aperture 238 in the head 240 is threadedly mated with the two outer members 234 and the sealing lip 230. At the opposite end there is an aperture 242 in an extension 244 of the outer member 234. The apertures 238, 242 are for connecting to the resilient member 120.

In another embodiment, the resilient member 120 is bendable. The resilient member 120 is preferably a wire that has sufficient stiffness to be pushed through the bore 114 but has sufficient flexibility to be bent. The resilient member may be for example, but not limited to wire that is at least about 150 pound test strength and is preferably 180 pound test strength. As the tube 112 can be bent into at least a U shape, and preferably into at least one coil, the resilient member 120 preferably can be bent into a U shape, and preferably into at least one coil, when housed in the tube 112.

In an alternative embodiment, the resilient member 120 is a plastic polymeric line that has sufficient stiffness to be pushed through the bore 114 but has sufficient flexibility to be bent in a U-shape. Preferably, the resilient member 120 can be bent in at least one coil. In another alternative embodiment, the resilient member 120 is a strap, which may be a plastic polymeric material or a metal that has sufficient stiffness to be pushed through the bore 114 but has sufficient flexibility to be bent. Preferably, the resilient member 120 can be bent in at least one coil.

The liquid sampler allows for samples to be taken at different depths within a given liquid sampler. As each sample is taken, the plug that is immediately distal to the sample retains the sample and separates it from the next sample to be taken. The liquid sampler can be moved to a different location or a different depth and another sample taken. In other words, sample n is retained by the nth plug and the nth+1 plug, sample n+1 is retained by the nth+1 plug and the nth+2 plug, sample n+2 is retained by the nth+2 plug and the nth+3 plug and so on. Once all the samples to be taken have been collected, the tube can be capped and taken to a different location for analysis. The tube is then uncapped and each sample can be decanted separately as described earlier by placing the collection tube 112 on a slight incline to the horizontal and pulling the plugs 116 out in the same direction as when gathering the samples. Sample sizes can be the same or can be different. If different sample sizes are desired, the plugs are spaced differently to provide different volumes. Similarly, the sample volume can be controlled by the distance between plugs and the tube diameter.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein.

The invention claimed is:

1. A liquid sampler for collecting a sample of a liquid, the liquid sampler comprising: a tube which includes a proximal end and a distal end, and a bore therebetween; a resilient member which is removably housed in the bore; a first plug which is attached to a distal end of the resilient member; at least a second plug which is attached to the resilient member proximally to the first plug; and a motor in motive communication with the resilient member.

2. The liquid sampler of claim 1, further comprising a controller in electronic communication with the motor.

3. A liquid sampler for collecting a sample of a liquid, the liquid sampler comprising: a tube which includes a proximal end and a distal end, and a bore therebetween; a resilient member which is removably housed in the bore; a first plug which is attached to a distal end of the resilient member; at least a second plug which is attached to the resilient member proximally to the first plug; and a grip which is attached to a second end of the resilient member, wherein the grip extends outward from the proximal end.

4. The liquid sampler of claim 3, wherein the first plug and the at least second plug each include a lip with an undercut above the lip and an undercut below the lip.

5. The liquid sampler of claim 4, wherein the plugs are polytetrafluoroethylene.

6. The liquid sampler of claim 5, wherein the resilient member is a wire that is at least a 150 pound test wire.

7. The liquid sampler of claim 5, wherein the resilient member is a rod.

8. The liquid sampler of claim 7, wherein the bore has a diameter of one centimeter to fifteen centimeters.

9. The liquid sampler of claim 8, wherein there is a chain of plugs.

10. The liquid sampler of claim 9, further comprising a removable housing which houses the tube.

11. The liquid sampler of claim 10, further comprising a threaded shaft proximate to each of the distal end and the proximal end of the tube.

12. The liquid sampler of claim 11, further comprising threaded caps that threadedly, releasably thread with the threaded shafts.

13. A method of sampling a liquid in a body of liquid, the method comprising: providing a liquid sampler, the liquid sampler including a tube which includes a proximal end and a distal end, and a bore therebetween, a resilient member which is removably housed in the bore, a first plug which is attached to a first end of the resilient member, at least a second plug spaced a distance apart from the first plug on the resilient member, and either a hand grip or a winch at the proximal end; immersing the tube in a body of liquid; urging the resilient member along the bore to draw the plugs into the bore; and collecting the liquid in the tube.

14. The method of claim 13, wherein the liquid sampler includes a chain of plugs spaced along the resilient member, and the method comprises collecting at least two liquid samples.

15. The method of claim 13, further comprising capping both the distal end and the proximal end of the tube.

* * * * *